May 3, 1932.  D. B. HOSEASON  1,857,023
DYNAMO ELECTRIC MACHINE
Filed Aug. 30, 1930
Fig. 1.
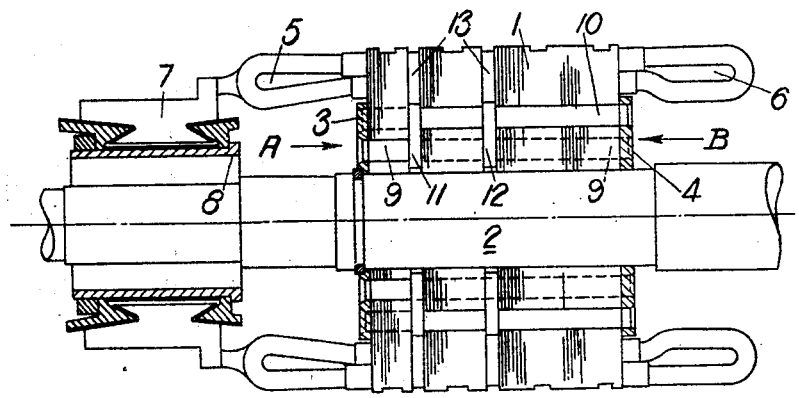
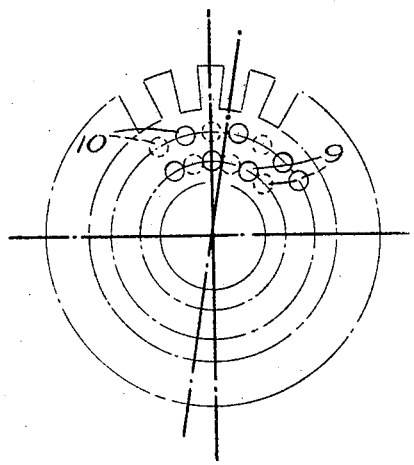
Fig. 2.
INVENTOR
Donald B. Hoseason
BY
ATTORNEY Patented May 3, 1932

1,857,023

UNITED STATES PATENT OFFICE

DONALD BRIGHT HOSEASON, OF BOWDON, ENGLAND, ASSIGNOR TO ASSOCIATED ELECTRICAL INDUSTRIES LIMITED, A COMPANY OF GREAT BRITAIN

DYNAMO ELECTRIC MACHINE

Application filed August 30, 1930, Serial No. 479,043, and in Great Britain September 4, 1929.

This invention relates to alternating and direct current dynamo-electric machines, and in particular electric motors, generators and like apparatus of the kind which are cooled by the flow or circulation of air or a gas through tunnels or ducts in the iron core.

The present invention comprises an arrangement of ducts in the stator and/or rotor core of a dynamo-electric machine with one or more intermediate spaces and relative displacement or staggering of the ducts on either side of said spaces so that the direction of the flow of the air or gas is changed comparatively suddenly in the interior of the core whereby turbulence is produced or increased and better cooling effected by the resulting greater scrubbing effect of the air or gas.

For the purpose of this invention it is preferable that the cooling air or gas should be caused to flow through the ducts at comparatively high velocity.

In applying the invention to a dynamo-electric machine having cooling ducts which are disposed axially or substantially axially in the iron core so that the cooling air or gas flows from one end to the other of the core there may be a space in the core between its ends through which the air or gas flowing through the ducts must pass and the ducts in the core on one side of the space are not in alignment with or are staggered with respect to the ducts in the core on the other side of the space. With such arrangement the streams of air or gas flowing from the ducts on one side of the space impinge upon imperforate parts of the core on the other side of the space and the direction of flow is changed, the air then leaving the space through the ducts in the core on said other side of the space. The space may be located centrally or elsewhere within the core and more than one space may be provided.

The use of the invention is particularly advantageous in dynamo-electric machines in which the air or gas flows inwardly through axially disposed ducts from both ends of the core to a common radial outlet. By relatively staggering the ducts on either side of the common radial outlet the air streams will impinge on two imperforate parts of the core.

The intermediate space may be located asymmetrically in the core in a position therein such that a "hot spot" may be wholly or in part eliminated. Thus in the case of certain dynamo-electric generators or motors the heating at one end of a core is different from that at the other end of the core, for instance in the armature of a direct current generator or motor wherein the end coils or windings at the commutator end are different from those at the other end of the machine such that the relative cooling along the armature core is not uniform, resulting in a "hot spot". In such cases the intermediate core space may be located at or near the hot spot so that more uniform cooling of the core is obtained.

The invention also comprises an arrangement wherein there are several intermediate spaces in the core and wherein the cooling air or gas enters the core from both ends thereof, the feature being that one or more of the intermediate spaces is located at a "hot spot" and is adapted to receive air or gas from opposite directions through relatively staggered ducts, the air or gas passing from this space in another direction, whilst the ducts on either side of other intermediate spaces are not relatively staggered but in alignment with one another so that at least some of the air or gas can flow from one set of ducts across said intermediate space to the other set of ducts towards another intermediate space on either side of which the ducts are relatively staggered as above set forth.

To enable the invention to be clearly understood it will now be described with reference to the accompanying drawings in which: Figure 1 is a side view, partly in conventional diagrammatic cross-section, of the armature of a direct current motor given by way of example only, and Figure 2 is a view of the left-hand packet of laminations as viewed from the left in Figure 1.

Referring to the drawings, 1 is the armature core the laminations of which are mounted directly on the shaft 2 between perforated end plates 3 and 4. The armature windings are indicated by 5 at the commutator end of the motor and by 6 at the other end thereof. A commutator 7 is mounted on a spider 8.

The field poles, the yoke or frame, the brushes, the fan or fans and various other parts are not shown since per se they form no part of the present invention.

The armature core 1 is provided with two circular rows of axial ducts 9 and 10 which are located as near as practicable to the armature slots without giving rise to excessive undue flux densities in the core. The end plates 3 and 4 are perforated to correspond with the ducts 9 and 10. The armature laminations are divided into three packets of unequal length with radial spaces 11 and 12 between them the width of these spaces being preferably about 3/8 inch. For instance, the left hand packet may be the smallest, say 1¼ inches long, the middle packet 2 inches long and the right hand packet 4 inches long. Radial spacers are indicated by 13 these being conveniently welded in position.

The main air paths are indicated by the arrows (A) and (B). As already herein stated the air velocity is preferably high. In the illustrated motor the air (A) flows into the axial ducts 9 and 10 to the left hand radial space 11, whilst the air (B) flows into the ducts 9 and 10 to both of the radial spaces 12 and 11. The air (A) and (B) flows out of the armature radially. The ducts 9 and 10 on either side of the left hand radial space 11 are relatively staggered whilst the ducts 9 and 10 on either side of the right hand radial space 12 are not relatively staggered. By the arrangement described of ducts and radial spaces a "hot spot" which otherwise existed near the left hand end of the core is substantially removed.

Various modifications may be made without departing from the scope of the invention which moreover is equally applicable to induction machines and totally enclosed machines and to the cooling of stators as well as rotors.

I claim:—

1. In a dynamo electric machine, a core consisting of packets of laminations in spaced relationship and having slots extending from end to end for receiving slot windings therein between the teeth of the core, and said core having a plurality of perforations behind the slots in the laminations providing longitudinal air ducts extending entirely through the core from end to end and communicating with the space between packets which provide a series of radial air ducts extending between the winding slots but with the ducts through one packet in line with an imperforate part of an adjacent packet.

2. In a dynamo electric machine, a core consisting of packets of similar laminations in spaced relationship and having slots extending from end to end for receiving slot windings therein between the teeth of the core, and said core having a plurality of perforations behind the slots in the laminations extending axially through each of the packets providing longitudinal air ducts extending entirely through the core from end to end and communicating with the space between packets which provide a series of radial air ducts extending between the winding slots but with the axial ducts through one packet in line with an imperforate part of an adjacent packet.

3. In a dynamo electric machine in accordance with claim 1 in which a packet at one end of the core is of smaller axial length than the packet at the other end of the core.

4. In a dynamo electric machine in accordance with claim 1, a commutator adjacent to one end of the core, and in which the packet nearest to said commutator is of smaller axial length than the packet at the other end of the core.

5. In a dynamo electric machine in accordance with claim 1 in which the laminations are stacked in at least three spaced apart packets and in which the ducts in two packets are in alignment with each other and in communication with two spaces between packets and the ducts in one packet being in line with an imperforate part of an adjacent packet.

6. In a dynamo electric machine in accordance with claim 1, a commutator adjacent to one end of the core, and in which the laminations are stacked in at least three spaced apart packets and in which the ducts in two packets remote from the commutator are in alignment with each other and in communication with two spaces between packets and the ducts in the packet adjacent to the commutator being in line with an imperforate part of an adjacent packet, and said packet adjacent to the commutator being of smaller axial length than the axial length of other packets.

In testimony whereof I have hereunto subscribed my name this 18th day of August, 1930.

DONALD BRIGHT HOSEASON.